United States Patent
Labovitz et al.

(10) Patent No.: US 8,549,139 B2
(45) Date of Patent: *Oct. 1, 2013

(54) METHOD AND SYSTEM FOR MONITORING CONTROL SIGNAL TRAFFIC OVER A COMPUTER NETWORK

(75) Inventors: Craig H. Labovitz, Ann Arbor, MI (US); Scott Iekel-Johnson, Ann Arbor, MI (US)

(73) Assignee: Arbor Networks, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/927,911

(22) Filed: Nov. 29, 2010

(65) Prior Publication Data

US 2011/0296005 A1 Dec. 1, 2011

Related U.S. Application Data

(63) Continuation of application No. 10/186,194, filed on Jun. 27, 2002, now Pat. No. 7,844,696.

(60) Provisional application No. 60/301,349, filed on Jun. 27, 2001.

(51) Int. Cl.
*G06F 15/173* (2006.01)

(52) U.S. Cl.
USPC .............................. 709/224; 709/231; 709/237

(58) Field of Classification Search
USPC ........................................... 709/224, 231, 237
See application file for complete search history.

(56) References Cited

U.S. PATENT DOCUMENTS 5,787,253 A * 7/1998 McCreery et al. ............ 709/231
6,061,735 A * 5/2000 Rogers .......................... 709/239

(Continued)

FOREIGN PATENT DOCUMENTS

EP 1041775 A1 10/2000
WO 99/22492 A1 5/1999

OTHER PUBLICATIONS

Charles L. Hendrick, "An Introduction to IGRP," The State University of New Jersey, Center for Computers and Information Services, Laboratory for Computers Science Research, Aug. 22, 1991.

(Continued)

*Primary Examiner* — Yves Dalencourt
(74) *Attorney, Agent, or Firm* — Edwards Wildman Palmer LLP; Scott D. Wofsy; Christopher J. Capelli

(57) ABSTRACT

A system and method is provided for detecting, tracking and/or blocking control signal attacks, which can occur between local computer systems and/or between remote computer systems, network links, and/or routing systems over a computer network. The system includes a router monitor adapted to receive a plurality of control signals and related information from the computer network and to process the plurality of control signals and related information to detect one or more control signal anomalies. The router monitor is further adapted to generate a plurality of alert signals representing the one or more control signal anomalies. The system further includes a controller that is coupled to the router monitor and is adapted to receive the plurality of alert signals from the router monitor. The controller is constructed and arranged to respond to the plurality of alert signals by tracking attributes related to the one or more control signal anomalies to at least one source, and to block the one or more control signal anomalies using a filtering mechanism executed in close proximity to the at least one source.

26 Claims, 9 Drawing Sheets

(56) References Cited

U.S. PATENT DOCUMENTS

| | | | |
|---|---|---|---|
| 6,137,782 A | 10/2000 | Sharon et al. | |
| 6,453,345 B2 * | 9/2002 | Trcka et al. | 709/224 |
| 6,704,795 B1 * | 3/2004 | Fernando et al. | 709/237 |
| 6,788,701 B1 | 9/2004 | Mahalingaiah et al. | |
| 7,158,497 B2 | 1/2007 | Li et al. | |
| 7,844,696 B2 * | 11/2010 | Labovitz et al. | 709/224 |
| 2003/0014540 A1 | 1/2003 | Sultan et al. | |
| 2005/0201302 A1 | 9/2005 | Gaddis et al. | |

OTHER PUBLICATIONS

O. Akashi, et al., "Multiagent-based Cooperative Inter-AS Diagnosis in ENCORE," Session Thirteen AI Techniques, 2000, pp. 521-534, NTT Network Innovation Laboratories, Tokyo, Japan.

Notification of the Transmittal of the International Search Report or the Declaration, International Application No. PCT/US02/20559.

* cited by examiner

METHOD AND SYSTEM FOR MONITORING CONTROL SIGNAL TRAFFIC OVER A COMPUTER NETWORK

RELATED APPLICATION

This application is a continuation of and claims priority under 35 U.S.C. §120 to U.S. application Ser. No. 10/186,194, now issued as U.S. Pat. No. 7,844,696, filed Jun. 27, 2002, entitled "METHOD AND SYSTEM FOR MONITORING CONTROL SIGNAL TRAFFIC OVER A COMPUTER NETWORK," which claims the benefit under 35 U.S.C. §119 (e) of U.S. Provisional Application Ser. No. 60/301,349, filed Jun. 27, 2001, entitled "METHOD AND SYSTEM FOR MONITORING CONTROL SIGNAL TRAFFIC OVER A COMPUTER NETWORK" by Craig H. Labovitz, the contents of each are incorporated herein by reference in their entirety.

FIELD OF THE INVENTION

The present invention relates generally to network communication systems and more particularly to network monitoring and control systems.

BACKGROUND OF THE INVENTION

Computer systems are often interconnected by computer networks for the purpose of communicating information. Computer systems connected on such networks communicate with each other by sending information through their electronic connections over media such as fiber or copper cabling, air, network communication systems such as routers, and any combination thereof using one or more communication protocols such as TCP/IP, for example. Networks can be organized into various types of topologies.

FIG. 1 illustrates one such topology that includes a network 100 having several networks 101-102 (e.g., local area networks (LANs)) that are coupled by a routing system 103. Computer systems of each local area network are connected to communications links 101a-101b. When a source computer system on a local area network 101 or 102 sends information to a destination computer system on the same network 101 or 102, the source computer system prepares a message (e.g., frame, packet, cell, or the like) that includes the address of the destination computer system and transmits the message on the communications link 101a or 102a. Other computer systems on that same local area network 101 or 102 (i.e., connected to the communications link 101a or 102a) reads the message that was transmitted. The destination computer system detects that its address is included in that message, and it processes the message accordingly.

Routing systems are generally used to couple one or more local networks to other networks (e.g., other public or private networks (e.g., the Internet, corporate network, etc.)). A routing system 103 is typically a dedicated special-purpose computer system to which each network 101, 102 is coupled, and routes information between these networks. The routing system 103 maintains routing information that identifies the location of other networks. In a TCP/IP routed network, for example, routing system 103 monitors packets sent on each network 101-102 to detect when a computer system on one network 101-102 is sending a packet to a computer system on another network (e.g., networks 101 or 102). When the routing system 103 detects such a packet, it forwards that packet onto the communications link 101a or 102a for the network 101 or 102 to which the destination computer system is connected. In this way, the routing system 103 interconnects networks 101 and 102 into an overall network 100. Similar routing techniques may be used, for example, to interconnect local area networks (LANs), wide area networks (WANs), and the Internet 104.

Routers make forwarding decisions based on local information stored in the router that identifies a next "hop" based on the destination of a packet. That is, the router generally forwards a packet out an interface to one or more other systems based on the destination address of the packet.

Routers communicate among each other to share information regarding the networks to which they are connected. This communication causes routers to update their local databases with this communicated information. Generally, routers maintain routing tables that store entries regarding the networks to which the router can communicate. Communication between routers is performed according to a method referred to in the art as a routing protocol. There are many different types of routing protocols used for sharing routing information among computer systems. For the TCP/IP protocol, for example, there are numerous routing protocols including Border Gateway Protocol (BGP), Routing Information Protocol (RIP), Open Shortest Path First (OSPF), Interior Gateway Routing Protocol (IGRP) and Enhanced Interior Gateway Routing Protocol (EIGRP) and others. An organization may implement one or more routing protocols within any network.

Due to the scale of communication networks such as the Internet, there are two types of routing protocols, intradomain and interdomain protocols, referred to in the art as Interior Gateway Protocols (IGPs) and Exterior Gateway Protocols (EGPs), respectively. Intradomain routing protocols are generally run in networks that are limited in scope and have a single administrative domain. Inter-domain routing protocols are used at the borders of administrative domains, where network entities of different organizations share information that identifies network addresses that may be reached through that network. For example, one network provider (e.g., an Internet Service Provider (ISP)) may indicate, via a routing protocol, which networks are reachable through the provider's network. The predominant protocol used in the Internet today is the Border Gateway Protocol (BGP). BGP may be used as either an intradomain or interdomain routing protocol.

FIG. 2 shows a functional block diagram of a network 101 that includes a number of networks (e.g., ISP networks) coupled together by a computer network. Each of the ISPs can include a number of systems 100 that are similar to that shown in FIG. 1, which are coupled together over the Internet. The wide area network 101 of FIG. 2 further shows a number of clients 105 coupled to ISP7 and servers 106 coupled to ISP1 and ISP2. Clients 105 can include a number of personal computers 105a, 105b and 105c that are adapted to receive information from a plurality of web pages or other information from the server 106, as well as web pages or other information from other computer systems (not shown), which are also coupled to the network shown in FIG. 2.

Server 106 can include a number of computer subsystems 106a, 106b, 106c, 106d and 106e, as well as associated databases (not shown). For example, server 106 may include, for example, a group of servers (e.g., server farm) configured to respond to requests for information received over a network. The computer subsystems 106a, 106b, 106c, 106d and 106e may be, for example, web servers of a web page hosting site that are adapted to store and retrieve a plurality of web pages and to provide the plurality of web pages or other information to the web customers 105 over the various ISPs.

In one specific example, a personal computer 105a of the web customers 105 can communicate a request to a web page hosting computer (server 106, for example) for requesting a particular web page having predetermined content. The request can be communicated from the personal computer 105a to the web page hosting computer 106 over a number of different paths within network 101 (e.g., by path ABCD or path ABEFG).

The choice of path is determined automatically through the exchange of signaling information between networking devices along all paths traversing some combination of A,B, C,D,E,F,G. Network devices in ISP1 and ISP2 signal availability of a path to site 106 to each neighbor network, ISP3 and ISP4. This signalling may occur, for example, according to a routing protocol that defines methods by which network devices determine how to forward information. More particularly, ISP3 and ISP4 and other network devices of network 101 communicate routing protocol information amongst each other indicating their knowledge of the network.

Once the paths are established, messages (e.g., web page requests from customers in 105) can begin to travel to the servers in 106. In the path ABCD, ISP7 initially receives the request for the web page from the personal computer 105a and forwards the request to ISP3. Similarly, ISP3 for-wards the request for the web page to ISP I, which ultimately for-wards the request to the web page hosting computer 106. Each of the ISP's also send control signals to the other ISPs. The control signals, includes among other things, information related to a return path from the site 106 to the requesting computer.

Referring further to FIG. 3, one problem occurs when an attacker computer system 107 of ISP5, for example, maliciously sends ISP4 erroneous or deceptive control signals. The deceptive control signals can include information indicating that ISP5 has the most efficient access to the web page hosting computer 106. In this example, the deceptive control signals would be communicated back to the personal computer 105a over the data path HIJK. In this instance, the personal computer's 105a request for the web page would not be received by the web page hosting site 106, because the request may be actually redirected to, for example, an attacker computer system 107 of ISP5 or to an incorrect destination. This may result in reduced access to the web page hosting computer 106, which can result in reduced business, lost sales and/or a general theft of service that the web page hosting site 106 would otherwise realize. This scenario is one type of what is referred to in the art as a Denial of Service (DoS) attack.

Conventional routing systems 103 (FIG. 1) have attempted to avoid erroneous control signal attacks, as described above, by employing various types of control signal encryption techniques to validate the integrity of the source of control signals. These control signals encryption techniques require that a number of public keys be distributed among the various ISPs for which the keys can be processed with other information residing on the various ISPs to encode and decode the control signals. However, this technique has not yet been implemented because of the complexity and associated costs related to the hardware and software necessary to encode and decode the control signals.

Other conventional routing systems 103 have attempted to avoid deceptive control signal attacks by employing a common Internet Routing Registry ("IRR"). In this technique, all of the ISPs are required to subscribe to the IRR and provide details of their policy and customer topology information. Using this topology information, providers can generate a number of access control lists ("ACLs"). The ACLs generally describe addresses of various ISPs for which a particular ISP (the ISP providing the ACL) will accept information. Thus, a particular ISP, which receives a control signal from another ISP can verify with the IRR that the particular ISP should accept or reject the control signal. However, this technique is limited because it requires all the various ISPs of the wide area network to subscribe to the IRR. There has only been limited acceptance of the IRR to date and therefore, limited effectiveness.

In addition to security concerns, another problem stems from the rate and volume of topology signaling information exchanged between ISPs. The volume and rate of change in signaled topology information poses significant network engineering management, planning and debugging challenges. As the signaling communication is automated, changes to network paths in response to failures or policy changes may occur without the knowledge or intervention of network operators.

SUMMARY OF THE INVENTION

According to one aspect of the invention, a method is provided for monitoring control signal traffic over a computer network comprising a plurality of network communication systems by a computer system, the method comprising acts of receiving, from at least one of the plurality of network communication systems, at least one control signal communicated to one or more other network communication systems; and storing the at least one control signal in a database of the computer system. According to one embodiment of the invention, the at least one control signal controls forwarding of data in the computer network. According to one embodiment of the invention, the at least one control signal is a route entry stored in a memory of the at least one of the plurality of network communication systems. According to one embodiment of the invention, the at least one control signal is a route update transmitted by the at least one of the plurality of network communication systems. According to one embodiment of the invention, the method further comprises an act of determining, based on the at least one control signal, an anomaly in the computer network.

According to one embodiment of the invention, the method further comprises an act of generating an alert signal based on the determined anomaly. According to one embodiment of the invention, the act of storing further comprises storing a plurality of control signals over time. According to one embodiment of the invention, the method further comprises an act of performing, in response to the act of determining the anomaly, an administrative act in the computer network. According to one embodiment of the invention, the anomaly includes one or more attributes and the method further comprises an act of tracking the one or more attributes of the anomaly to at least one source. According to one embodiment of the invention, the method further comprises an act of filtering a control signal produced by the at least one source that relates to the anomaly. According to one embodiment of the invention, the act of filtering is performed in one of the plurality of network communication systems. According to one embodiment of the invention, the one of the plurality of network communication systems is a router. According to one embodiment of the invention, the method further comprises an act of creating a filter in the router to filter control data transmitted by the at least one source.

According to another aspect of the invention, an apparatus is provided for monitoring control signal traffic over a computer network comprising a plurality of network communication systems. The apparatus comprises a monitor that receives, from at least one of the plurality of communications systems, at least one control signal communicated to one or more other network communications systems and which stores the at least one control signal in a database. According to one embodiment of the invention, the apparatus further comprises a controller that receives, from the monitor, the at least one control signal and stores the at least one control signal in the database. According to one embodiment of the invention, the monitor stores the at least one control signal in a persistent archive. According to one embodiment of the invention, the apparatus further comprises a detector that detects an anomaly based on the at least one control signal. According to one embodiment of the invention, the apparatus further comprises a profiler that generates a profile of at least one of network communication trends in the computer network and topology of the computer network. According to one embodiment of the invention, the apparatus further comprises a controller that is adapted to receive the detected anomaly from the detector, and is adapted to communicate the anomaly in an alert message.

According to another aspect of the invention, a computer-readable medium is provided that is encoded with instructions for execution on a computer system, the instructions when executed, perform a method comprising acts of receiving, from at least one of the plurality of network communication systems, at least one control signal communicated to one or more other network communication systems, and storing the at least one control signal in a database of the computer system. According to one embodiment of the invention, the at least one control signal controls forwarding of data in the computer network. According to one embodiment of the invention, the at least one control signal is a route entry stored in a memory of the at least one of the plurality of network According to one embodiment of the invention, the at least one control signal is a route update transmitted by the at least one of the plurality of network communication systems. According to one embodiment of the invention, the method further comprises an act of determining, based on the at least one control signal, an anomaly in the computer network.

According to one embodiment of the invention, the method further comprises an act of generating an alert signal based on the determined anomaly. According to one embodiment of the invention, the act of storing further comprises storing a plurality of control signals over time. According to one embodiment of the invention, the method further comprises an act of performing, in response to the act of determining the anomaly, an administrative act in the computer network. According to one embodiment of the invention, the anomaly includes one or more attributes and the method further comprises an act of tracking the one or more attributes of the anomaly to at least one source. According to one embodiment of the invention, the method further comprises an act of filtering a control signal produced by the at least one source that relates to the anomaly. According to one embodiment of the invention, the act of filtering is performed in one of the plurality of network communication systems. According to one embodiment of the invention, the one of the plurality of network communication systems is a router. According to one embodiment of the invention, the method further comprises an act of creating a filter in the router to filter control data transmitted by the at least one source.

Further features and advantages of the present invention as well as the structure and operation of various embodiments of the present invention are described in detail below with reference to the accompanying drawings. In the drawings, like reference numerals indicate like or functionally similar elements.

BRIEF DESCRIPTION OF THE DRAWINGS

The invention is pointed out with particularity in the appended claims. The above and further advantages of this invention may be better understood by referring to the following description when taken in conjunction with the accompanying drawings in which similar reference numbers indicate the same or similar elements.

In the drawings.

DETAILED DESCRIPTION

Figure 1:
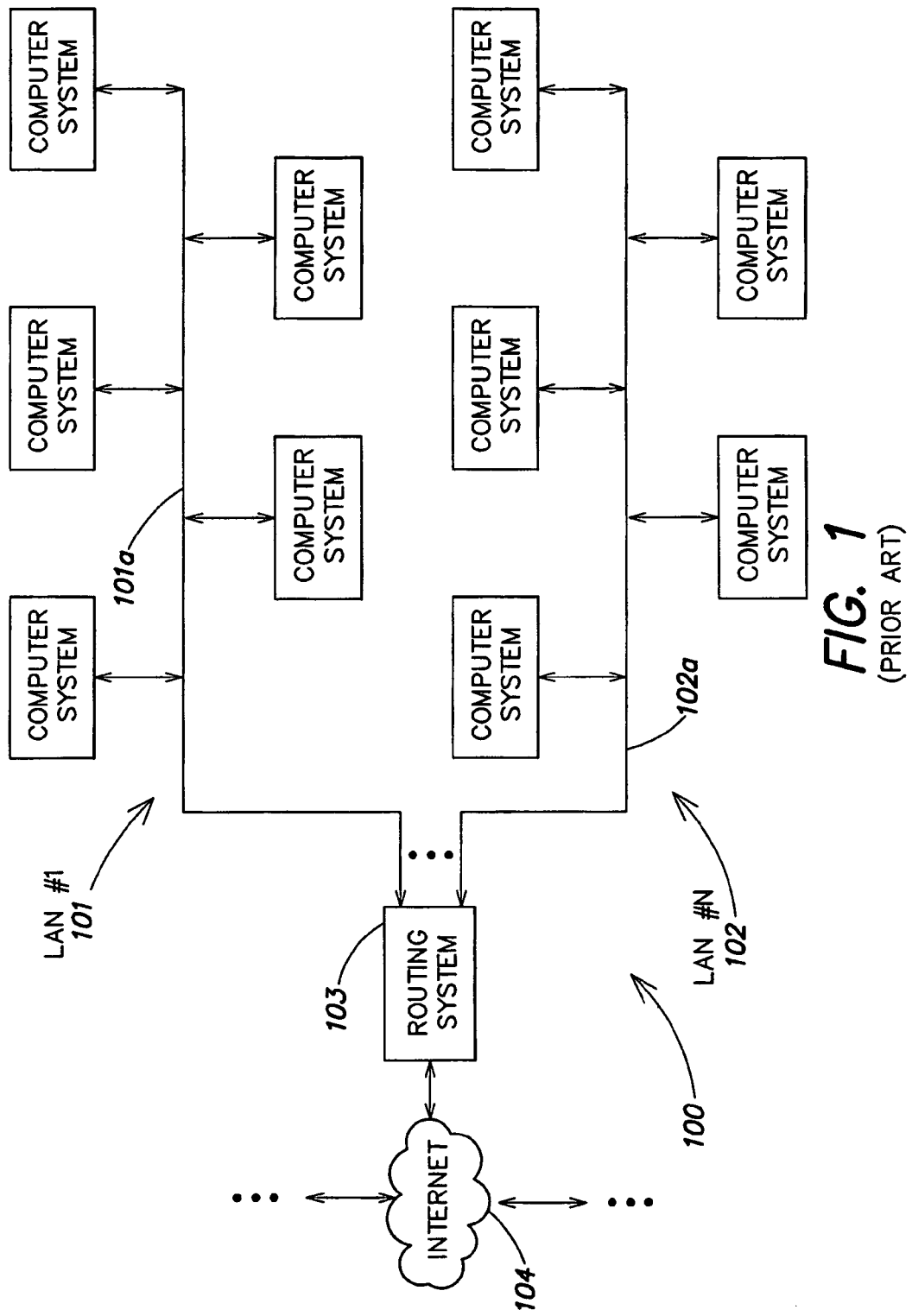
FIG. 1 is a high level block diagram of a conventional networked computer system.
Figure 2:
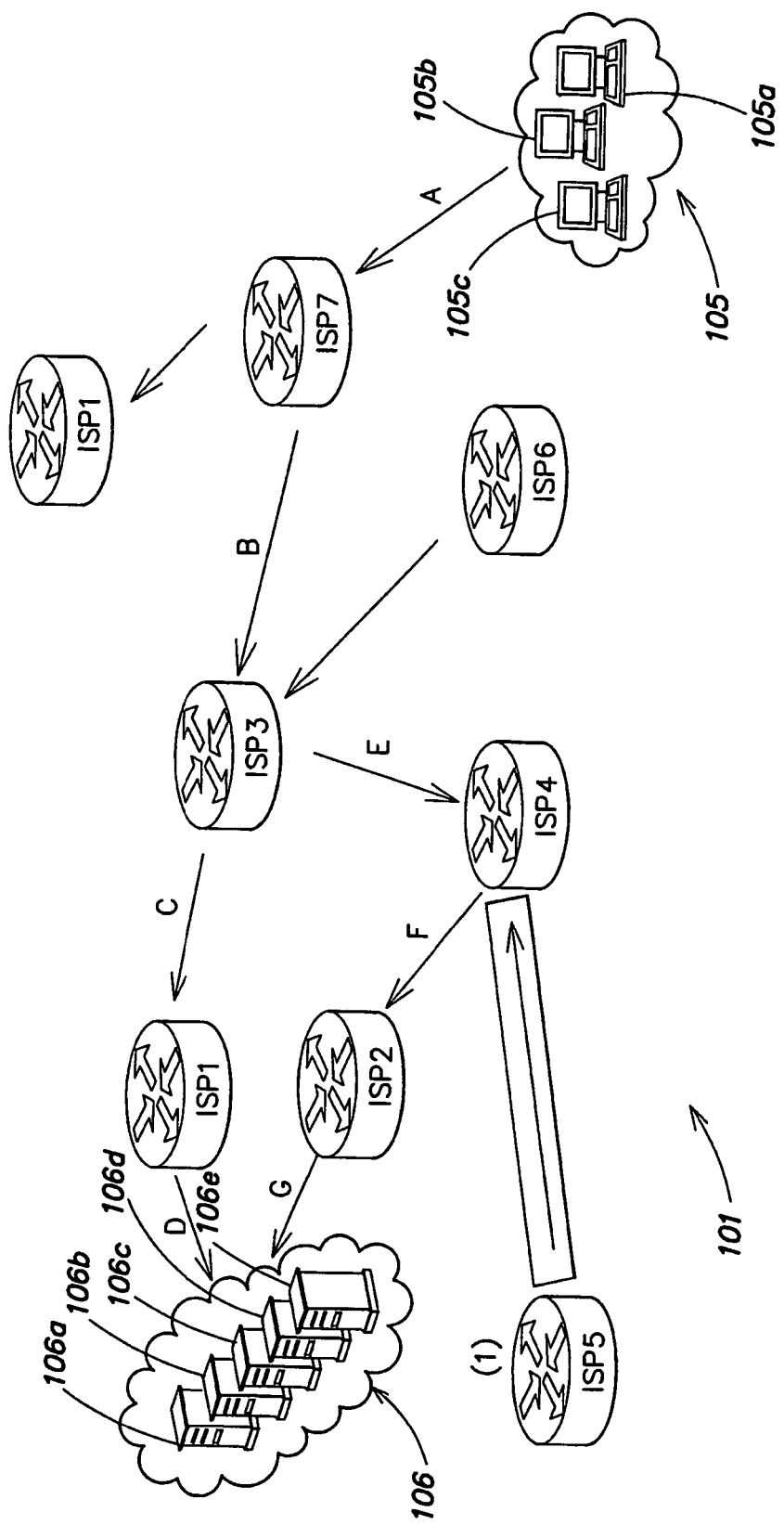
FIG. 2 is a high level block diagram of a conventional network computer system including a plurality of Internet Service Providers each of which includes a plurality of network computer systems.
Figure 3:
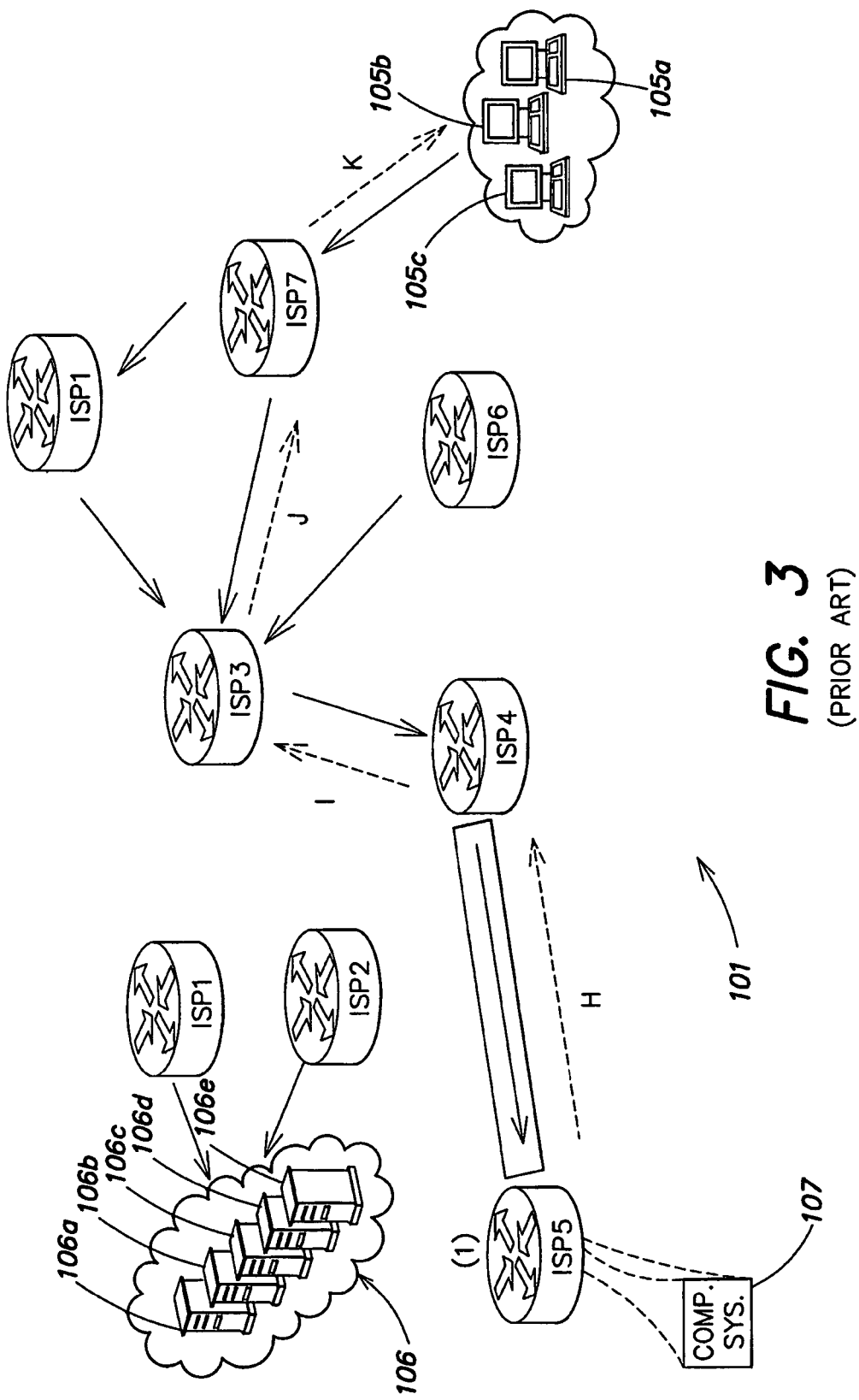
FIG. 3 is a high level block diagram of the conventional network computer system of FIG. 2 further showing misdirected traffic as a result of Denial of Service (DoS) attack.

Network engineers often have no method of knowing the previous state of the network topology, or what changes in the topology occurred. This lack of instrumentation poses a challenge for engineers in debugging customer complaints, such as recent periods of poor web connectivity.

To address problems associated with managing signaling information, a number of providers offer freely available, web-accessible or other type of network management interfaces to their networking devices. These interfaces provide a "looking glass" into the current state of entries stored in routing tables by one or more networking devices in each provider's network. These management interfaces, however, only provide a limited view of the network (it is only limited to a specific device being monitored) and these management interfaces do not provide historical information.

More particularly, routers in packet forwarding networks do not keep a history of the routing information that they share in the routing protocols. This information is incorporated into each router's forwarding tables which store the information determining next hop forwarding. Once the information is incorporated into the router's forwarding state it is discarded. As such, there is no way to reconstruct the sequence of routing events that led to a particular forwarding table.

However, routers store a significant amount of information. For example, backbone routers in the Internet currently receive tens of thousands (and some times millions) of BGP routing update messages per day. This amount of messages reflect the continual churn in Internet topology and infrastructure, and stem from a combination of network failures, network misconfiguration, bugs, misuse, and policy/commercial changes through the global Internet.

Therefore, an unsolved need remains for a system and method for managing computer network topology signaling information and monitoring, detecting, tracking and/or blocking control signal anomalies.

In accordance with various aspects of the present invention, a system and method is provided for managing network topology signaling information and for monitoring, detecting, tracking and blocking control signal anomalies communicated between routers located in various locations of a communications network. More generally, a system and method is provided for collecting, indexing, and retrieving control information for a variety of uses. This control information may be, for example, routing information maintained and communicated by routing systems. Also, this control information may be used to perform route cause analysis of router failures. Moreover, such a system may monitor routing configuration and could report on anomalies that occur in the routed network. These anomalies, for example, may cause an interruption or degradation of service. For example, it may be useful to detect whether the routed network is optimally configured, whether routes are stable or changing over time, whether routes are invalid, whether there are abrupt shifts in topology, or the like. By monitoring and storing control information, the ability to detect such anomalies is possible.

For purposes of illustration and to facilitate a further understanding of various aspects of the present invention, various embodiments of the invention may be employed in an Internet-based computer network system. However, as understood by one skilled in the art, the present invention is not limited to Internet-based systems and can include systems employing other computer networks (e.g., public and/or private networks) and/or stand-alone systems.

Figure 4:
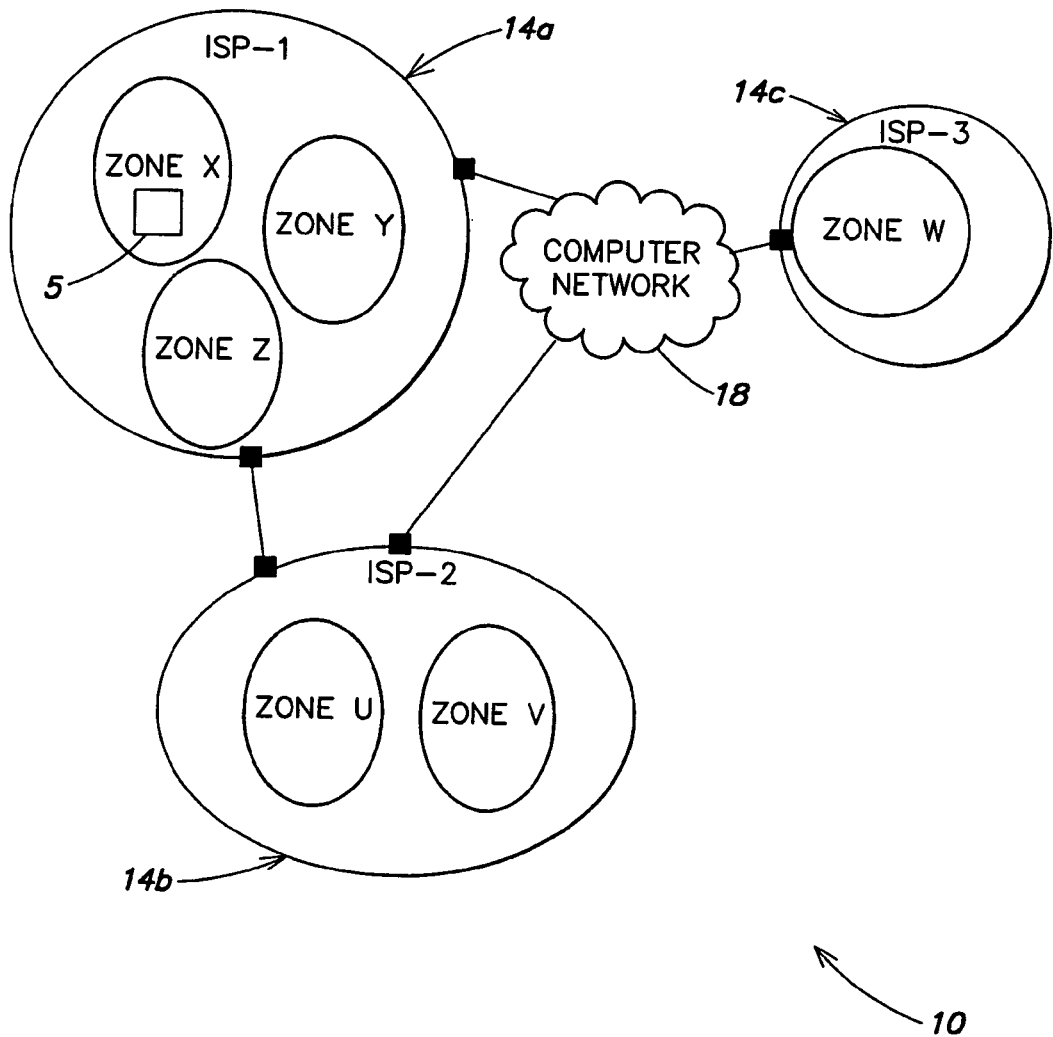
FIG. 4 is a high level block diagram of a computer network system according to one embodiment of the present invention.

Referring to FIG. 4, in one embodiment of the present invention a system 5 for management of network signaling information and for monitoring, detecting, tracking and/or blocking control signal anomalies communicated between routers located in various locations of a network is incorporated in a network computer system 10. Network 10 may be, for example, a wide area network (WAN) connecting Internet Service Provider (ISP) networks, but it should be appreciated that various aspects of the invention may be implemented on any type of network. The invention is not limited to any particular network configuration, routing protocol, or routing system.

System 5 can be located on a single server computer, which is in communication with components of computer system 10 or distributed over a plurality of server computers, which are also in communication with components of the network computer system 10. System 5 may be implemented, for example, as hardware and/or software that implements one or more functions associated with various aspects of the invention.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to implement various aspects of the invention. Further, various aspects of the invention may be implemented on a single computer or may be distributed among a plurality of computers attached by a communications network.

For example, system 5 may be implemented as specialized software executing in a general-purpose computer system (not shown). A general-purpose computer system may include a processor connected to one or more memory devices, such as a disk drive, memory, or other device for storing data as is known in the art. Memory is typically used for storing programs and data during operation of the computer system. Devices located within the computer system may be coupled by a communication device such as a network (e.g., a system bus). The computer system may also include one or more input/output devices, such as keyboard, mouse, or printing device. In addition, the computer system may contain one or more communication devices that connect the computer system to a communication network (e.g. network 18, or any network of network system 10, for example).

The computer system may be a general-purpose computer system that is programmable using a high-level computer programming language. The computer system may be also implemented using specially programmed, special purpose hardware. In a typical general-purpose computer system, the processor is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX operating system available from various sources. Many other operating systems may be used.

Various embodiments of the present invention may be programmed using an object-oriented programming language, such as SmallTalk, JAVA, C++, Ada, or C# (C-Sharp). Other programming languages may also be used. Alternatively, functional, logical, or interpreted programming languages may be used. It should also be appreciated that one or more portions of system 5 may be distributed to one or more computers (not shown) coupled to one or more communications networks. These computer systems may also be general-purpose computer systems.

It should be understood that the invention is not limited to a particular computer system platform, processor, operating system, or network. Also, it should be apparent to those skilled in the art that the present invention is not limited to a specific programming language or computer system and that other appropriate programming languages and other appropriate computer systems could also be used.

The network computer system 10 may include a plurality of networks (e.g., ISP networks 14a, 14b and 14c) that are coupled together over a computer network 18 via one or more communication links. The ISPs 14a, 14b and 14c can also be coupled directly to each other via one or more communication links (not shown). Each of the ISPs 14a, 14b and/or 14c can include a plurality of computer network zones. These zones may correspond, for example, to routing domains serviced by a respective ISP. As shown in FIG. 4, the ISP 14a includes computer network Zone X, Zone Y and Zone Z. The ISP 14b includes computer network Zone U and Zone V. The ISP 14c includes computer network Zone W.

Figure 5:
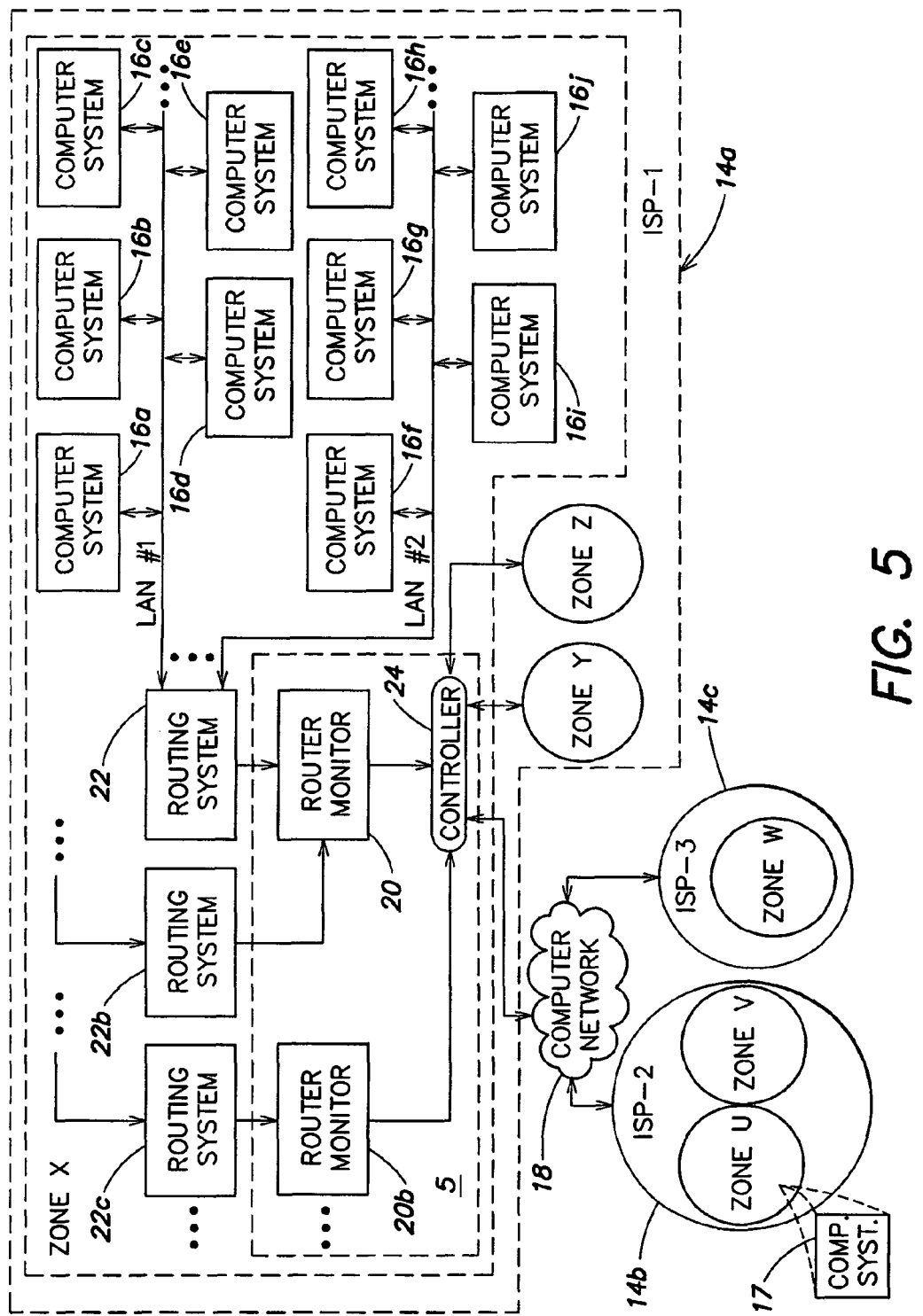
FIG. 5 is a block diagram of a system according to one embodiment of the invention that shows a partially expanded view of the computer network system shown in FIG. 4.

FIG. 5 shows a partially expanded view of system 5 according to one embodiment of the invention. In FIG. 5, Zone X of the ISP 14a includes a number of networks coupled to a central routing system 22. Each network is coupled to a plurality of computer systems 16a, 16b, 16c, 16e, 16f, 16g, 16h, 16i and 16j (hereinafter collectively referred to as "computer system(s) 16"). The computer network Zones Y and Z, which are also located on the ISP 14a, can be similarly constructed and arranged as computer network Zone X. Further, the computer network Zones U and V, which are located on the ISP 14b and the computer network Zone W, which is located on the ISP 14c, can also be similarly constructed and arranged as computer network Zone X. ISP 14*a* may be coupled to other ISPs (e.g., ISPs 14*b*, 14*c*) by a communications network 18. Network 18 may also include one or more network communication systems (e.g., routers) coupled to one or more network communication systems (e.g., routing systems 22, 22*b*, 22*c*) for the purpose of transferring user data and control information between the ISP networks.

The system 5 includes a router monitor 20, an optional router monitor 20*b* and a zone controller 24. Router monitor 20 monitors control information associated with one or more routers. In Zone X, the router monitor 20 is coupled to the central routing system 22. The router monitor 20 is further coupled to a zone controller 24, which provides a primary interface to Zone X of the ISP 14*a* and processes one or more messages received from one or more router monitors. Zone controller 24 may be configured to store, in a database, control information received from one or more router monitors.

In another embodiment of the invention, the router monitor 20 can be coupled to one or more other router systems, such as routing system 22*b*, as shown in FIG. 5. In addition, the zone controller 24 can be coupled to one or more other router monitors, such as router monitor 20*b*, also shown in FIG. 5. Further, the router monitor 20*b*, can be coupled to one or more other routing systems, such as the routing system 22*c*. Although various aspects of the invention are described in terms of routers, it should be appreciated that any network communication system may be monitored, and the invention is not limited to monitoring routers or control information relating to routers. For example, switching systems and their control information may be monitored.

The zone controller 24 located in Zone X of the ISP 14*a* provides a primary interface to the computer network Zone Y and to the computer network Zone Z, which are both located on the ISP 14*a*. The zone controller 24 further provides a primary interface to the computer network Zone U and the computer network Zone V, which are located on the ISP 14*b*, over the computer network 18. Similarly, the zone controller 24 further provides a primary interface to computer network Zone W, which is located on the ISP 14*c*, over computer network 18.

In one embodiment of the present invention, computer systems 16 located in computer network Zone X of the ISP 14*a* can each comprise a conventional computer server such as an "NT-Server" which can be provided by Microsoft of Richmond, Wash. or a "Unix Solaris Server" which can be provided by Sun Micro Systems of Palo Alto, Calif. These computer systems 16 can be programmed with conventional Web-page interface software such as: "Visual Basic", "Java", "JavaScript", "HTML/DHTML", "C++", "J++", "Perl" or "Perlscript", "ASP", "C#", or any other programming language. These computer systems can further be programmed with an operating system, Web server software, Web Application software, such as an e-commerce application and computer network interface software, or other software that allows them to exchange information.

Each of the routing systems 22, 22*b* and 22*c*, shown in FIG. 4, can be a conventional router, such as a "Cisco 12000" router, available from Cisco Corporation of San Jose, Calif. or "M-series" or "T-series" routers available from Juniper Networks, Inc. of Sunnyvale, Calif. or any other router or network communication device that exchanges topology and/or data forwarding control information (e.g., switches). The routers are configured to gather and store a plurality of control signals and related information by, for example, communicating using a routing protocol such as BGP. Further, each of these routing systems can be adapted to forward control signaling information to the collector computing system 5. The plurality of control signals and related information can include a data path description through various ISPs 14*a*, 14*b* and/or 14*b* of a wide area network for enabling a web farm or hosting computer system to provide web pages or other information to a requesting computer system via the various ISPs 14*a*, 14*b* and/or 14*b*.

Figure 6:
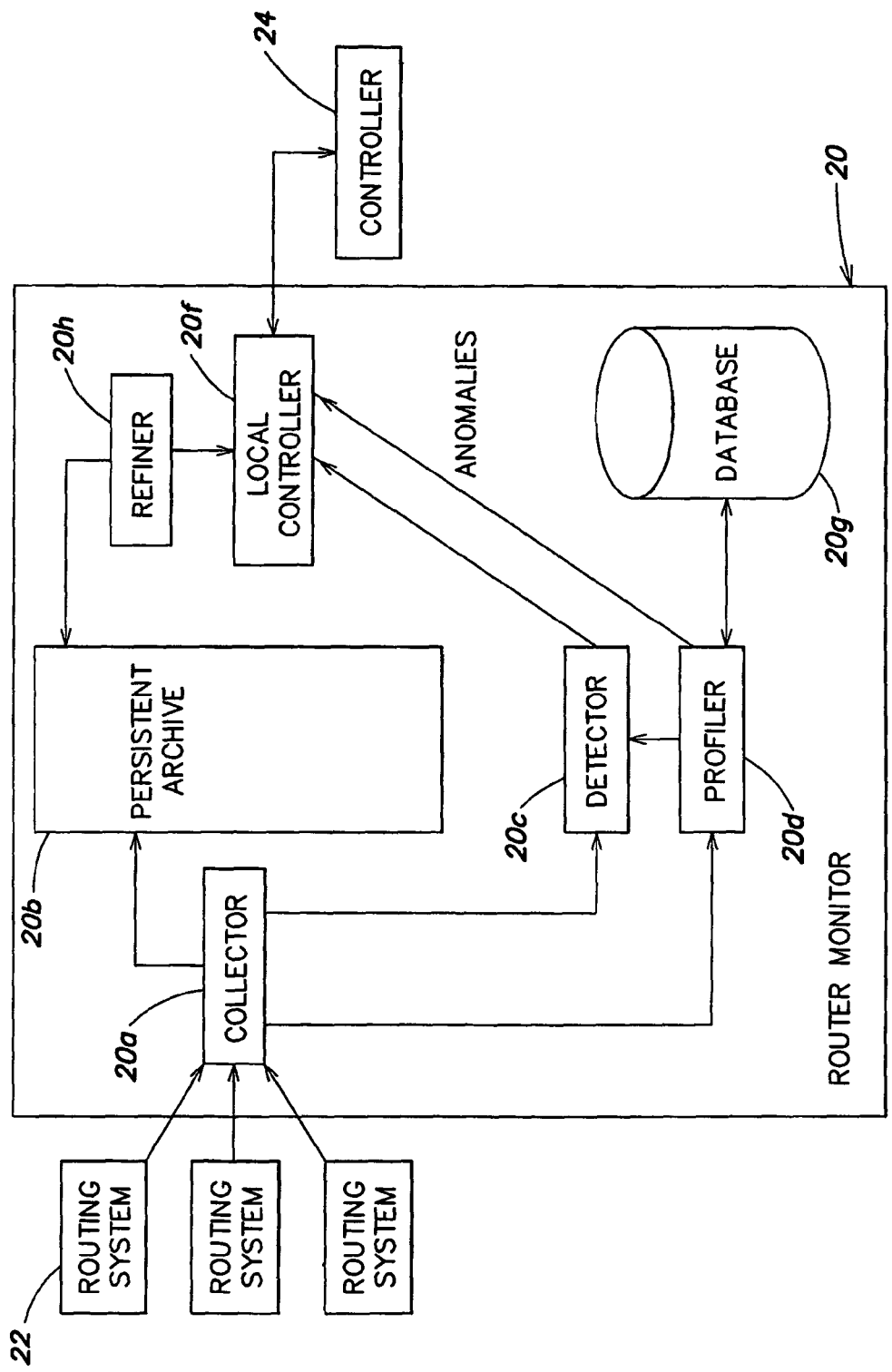
FIG. 6 is a high level block diagram of a router monitor according to one embodiment of the invention.

FIG. 6 shows a router monitor 20 according to one embodiment of the invention that collects and processes control information. Router monitor 20 includes a collector 20*a* coupled to the routing system 22. The collector 20*a* is coupled to a persistent archive database 20*b*, a detector 20*c* and a profiler 20*d*. The detector 20*c* is coupled to a local controller 20*f*. The profiler 20*d* is coupled to database 20*g*, as well as to the local controller 20*f*. The local controller 20 is coupled to a refiner 20*h*, which is coupled to the persistent archive database 20*b*. The local controller 20*f* is further coupled to the zone controller 24.

The router monitor 20 is adapted to receive the plurality of control signals and related information from the routing system 22 and to process the control signals and related information to support network engineering and management functions as well as detect control signal anomalies. The router monitor 22*b* of Zone X, as well as other various router monitors (not shown), which are included in the other various Zones U, V, W, Y and Z may be similarly constructed and arranged as the router monitor 20 of Zone X.

In another embodiment of the system, the router monitors may be deployed in a multiplicity of remote network locations, such as in networks, ISP1, ISP2 and ISP3. The remote monitors may be configured, for example, by a controller to detect changes in routing information, for example, information related to network A announced by ISP7. Examples of remotely monitored information might include changes to the path, or detail of the signal describing network A in ISP 1, ISP2 and ISP3. For example, the monitored information may include routing update messages according to one or more routing protocols.

Collector

More specifically, the collector 20*a* of the router monitor 20 is adapted to receive the plurality of control signals and related control signal information from the routing systems 22, 22*b* and/or 22*c*. The collector 20*a* is further adapted to normalize or statistically categorize the control signals and related control signal information to generate a number of records. The collector 20*a* provides a copy of the record to the detector 20*c* and also stores a copy of the record in the persistent archive 20*b*.

According to one embodiment of the invention, collector 20*a* may compute statistical information regarding data it has collected, and may infer certain information. For example, collector 20*a* may continuously calculate statistical information about the routing information it receives on its peering sessions. Collector 20*a* may track both explicit and calculated or implicit information. Explicit statistics may be calculated directly from the routing table stored in a router (e.g., BGP routing table) and the routing updates (e.g., BGP update messages) received. In the case of BGP, implicit information may include several types of BGP routing table changes that are identified based on the current routing table state when a BGP update is received.

Each of these statistics may be tracked separately, for example, on a network-wide, per-router, and per-inferred-peer basis. Standard statistical measures (e.g., sum, mean, median, standard deviation, local minima/maxima) may be calculated over a variety of time periods (for example, five minute periods) and each sample is stored along with the time it represents in the database for later retrieval and analysis.

These statistics may be used, for example, by a query facility in response to queries, and/or by a statistical modeling engine to build a statistical model of network behavior (as described in more detail below).

Explicit information that collector 20a may track may include, for example:
- number of routes (average)
- number of unique AS (Autonomous System) Paths (average)
- number of BGP updates (sum)
- number of BGP announcements (sum)
- number of BGP withdrawals (sum)
- number of times each BGP peering session goes down (sum)
- number of times each BGP peering session comes up (sum)
- number of unique ASes in the routing table (average)
- number of unique origin ASes in the routing table (average)
- number of BGP communities (average)
- System start and stop Implicit information that may be monitored may include, for example:
- number of AADup
- number of WWDup
- number of AADiff
- number of TDown
- number of Tup
- probability of ASPath adjacencies
- probability of path selection
- probability of origin AS prefix origination
- probability of peer router prefix origination
- probability of path stability These implicit events are well-known in BGP routing. Briefly, they include:

AADup Duplicate Announcement—An announcement for a route identical to one that already exists in the routing table; the announcement must be identical in all attributes to the existing route, otherwise it is an AADiff.

WWDup Duplicate Withdrawal—A withdrawal for a route that has already been withdrawn from the routing table.

AADiff Implicit Change—A route is announced for a prefix which already has an existing route. However, the new route is different in one or more attributes than the existing route.

TUp Transition UP—a route comes up (is added to the routing table). This does not include attribute changes to an existing route.

TDown Transition Down—a route goes down (is removed from the routing table)

In accordance with one embodiment of the invention, collector 20a maintains BGP peering sessions with BGP routers to obtain information. In one embodiment of the invention, peering sessions are passive peering sessions. That is, collector 20a does not propagate any BGP state or routing information to other routers. The collector 20a does, according to one embodiment of the invention, send BGP Keepalive messages to its peers to maintain the peering sessions.

One advantage of having a totally passive approach is that the collector 20a does not change the state of the network it is monitoring. More particularly, according to one embodiment, collector 20a does not propagate BGP updates or state changes, which makes it a low-impact method for monitoring network routing.

According to one embodiment of the invention, collector 20a has the ability to understand and process routing messages. For instance, collector 20a may employ a BGP routing protocol, and as discussed above, collector 20a may be capable of maintaining BGP peering sessions with one or more BGP routers. Collector 20a may be capable of receiving BGP updates from network routers over its peering sessions and may store them in a database (e.g., persistent archive 20b and/or database 20g, for example). Collector 20a may collect a wide range of state and topology information from routers, and collector 20a is not limited to collection of any type of information. The invention is not implemented to any particular data type or method for collecting and/or storing such information.

According to one aspect of the invention, data may be timestamped and stored in a database (e.g., in persistent archive 20b). Such data may include, for example, routing state changes and topology updates received by collector 20a. In the case of the BGP routing protocol, data stored may include BGP attributes and the source of the change. For example, such BGP and system state information that may be tracked and stored in the database may include, for example:
- peering session up
- peering session down
- peering session errors
- administrative/configuration changes
- user-specified events
- system start
- system stop This data may be timestamped, for example, to the nearest second and stored in the database. Also, according to another aspect of the invention, a query facility may be provided that allows a user (e.g., administrator or other system) to query the data stored in the database. This may allow a user to determine, at a particular point in time, the routing state of the network. This may be beneficial, for example, in performing root cause analysis of a network problem.

Data collected by monitor 20 may, according to one embodiment of the invention, be accessed using a query facility that allows a user to obtain data from one or more databases associated with monitor 20. For example, a user may be allowed to query current and past routing changes and routing state.

Routing Database

As discussed, data collected by monitor 20 may be stored in a database (e.g., archive 20b, database 20g, or other database) that stores routing state information. Information collected by the collector 20a may be stored, indexed, and retrieved in response to queries from the query facility. The database may also store statistical information about the observed routing topology and state changes. This statistical information may be generated, for example, by routing collector 20a.

The database stores three important types of information generated by the collector 20a. It includes a change store, which stores a time stamped, sequential archive of BGP updates. Updates may be tagged with indices to simplify later queries, including the timestamp of the update (with second granularity, for example) and the source of the information. The change store may also include other event information including BGP state changes, synchronization messages, and system-level events. Synchronization messages are internally generated, time stamped messages that uniquely identify a snapshot (described in more detail below) corresponding to that position in the sequential archive of changes. Updates and messages in the change store may be stored, for example, in the order in which they were received by collector 20a.

Snapshots are the second type of information stored by the database. A snapshot is a complete dump of the global routing table state at a given moment in time. A timestamp may also be stored with each snapshot. The timestamp, for example, indicates the exact time the snapshot was taken.

The routing database may also store statistical information calculated by the collector 20a as described above.

According to one embodiment of the invention, a system is provided that may use the above types of information to reconstruct the routing table state at arbitrary times in the past. By querying the statistical information, it can also show the history of instability in the routing table state over time, and can be used to identify (or at least narrow a potential set of) the causes of that instability. This is a major innovation over the capabilities of previous systems used to manage routed networks.

According to one embodiment of the invention, a databse is provided that efficiently indexes and stores routing information for retrieval. More particularly, a database according to one embodiment of the invention allows for fast and easy searches and quick and efficient pruning of old or unwanted data. All database records may, for example, be time-stamped to within one second granularity, and may be stored in sequential order based on the timestamp. Although particular database storage methods and formats are described herein, the present invention is not limited to any particular implementation. The following database architectures described below are one implementation of a routing database according to various embodiments of the invention.

Change Store Architecture

The change store may be represented by multiple flat binary files. Each file contains 15 minutes worth of change records, and each 15 minute period is aligned on quarter-hour boundaries based on the wall-clock time of the system. (For example, one file might contain data starting for the time interval 16:00:00 Sep. 12, 2001 through 16:14:59 Sep. 12, 2001. The next file in time order would run from 16:15:00 Sep. 12, 2001 through 16:29:59 Sep. 12, 2001, and so on.)

Each file is named based on the start time of the fifteen minute period it covers. This implies that no separate database index system is needed in order to find a given record. To locate change events that happened at a particular time, the system simply opens the file named with the start time of the fifteen minute period of interest.

Snapshot Store Architecture

The snapshot store may be kept similarly to the change store. A complete global routing table snapshot may be stored, for example, in a single flat file. One snapshot is taken every four hours, on the hour, and the file is named with the time of the snapshot. It is therefore possible to establish exactly where in the sequential change store a given snapshot falls, based on the timestamps of the snapshot and the change records.

Statistics Store Architecture

The Statistics Store keeps data slightly differently than the other two stores, because it stores a large number of samples for a set of interesting statistics categories. As mentioned above, statistics information may be aggregated (either by summing or averaging, for example) into a single number representing a five-minute sample for that statistic, which is then stored in the routing database as follows.

All statistics may be stored, for example, in a set of flat files, each file containing all of the samples from a given time period. Each file includes a set of records, one for each type of statistic kept. Each record contains a numerical ID, corresponding to a well-known constant representing one of the types of statistics, the set of sample values for that file's time period for that statistic, and for efficiency a separate entry for the maximum observed sample value for that time period. Because all of the records in a file contain the same number of samples, all records are the same size. Each file also contains a header, which contains the start and stop timestamp of the samples contained in the file. Each file is named by the timestamp of the time period its samples cover.

Because each record in a file is of fixed length, it is possible to deterministically read the samples for any data type for any time period simply by opening the file covering that time period and calculating the offset in the file where the record is located. Because each record in a file is the same size, this calculation can be easily performed by multiplying the numerical id of the statistic type to be read by the size of each record in the file. This allows a lookup of the sample for a given time for any type of statistical information stored in the database, as well as for the maximum value observed over the given time period for each statistic.

Database Pruning

To reduce the disk storage requirement of the routing database, the routing database may be periodically pruned to remove old and unwanted information. Periodically, all data older than a configurable time interval (default is six months) may be deleted, for example. The system may prune by first selectively removing state table dump files beyond a certain timeframe. Because only one complete state table file (or system/peer start) is used for state synchronization, pruning according to one embodiment of the invention trades off data query speed (which is dominated by state synchronization time) with data storage requirements.

Because of the efficient database architecture, removing this data is as easy as deleting all files with names that correspond to times older than the configured time interval. The database is also pruned if it runs out of disk space. In this case, the oldest files are deleted until there is sufficient disk space to store new data.

Statistics Store Data Compression

Due to the large amount of data that can possibly be generated each day by collector 20a, it may be desired to compress data over time so that a storage device associated with monitor 20 does not become full. This may be performed, for example, by using industry-standard round-robin database techniques. Specifically, the system may aggregate older 5-minute samples into samples covering larger time periods. Depending on disk size, the routing database can keep a known (and configurable) number of days worth of unaggregated 5-minute samples. In one embodiment of the invention, each day's worth of samples are kept in a separate file and named with the timestamp of the day the file covers.

Samples older than the number of days to be kept are aggregated together and stored on a weekly basis. To aggregate, six (6) 5-minute samples may be averaged together to yield one week sample of 30-minutes. If desired, the ratio of day to week samples can be configured to trade off disk usage vs. sample granularity. A week's worth of 30-minute samples are then stored in a single file covering one week, which is again named based on the time period that it covers. As with days, a configurable number of week time periods can be stored before the system aggregates the samples into the next time period, which is monthly. The maximum 5-minute value of the days covered by each week file is also stored for each record, allowing the system to later determine the peak value for each statistic.

The sample aggregation continues in a similar fashion through two more aggregation levels. The next aggregation is weekly to monthly. By default, eight (8) 30-minute week samples are averaged together to form a 4-hour month sample, and a month's worth of these samples are stored in a file that is again named by the time period covered, for example. As before, the ratio of week to month samples is configurable, the number of months to be stored before aggregating further is also configurable, and the maximum of the maximum 5-minute samples from the weeks covered is preserved for each record.

The next and final aggregation level is yearly, in which (by default) 12 month samples are averaged together to make one 2-day year sample, and a year's worth of samples is stored for each record in a file named after the time period covered. This aggregation level is configurable as before, and other information is carried over as with previous aggregation levels.

It should be appreciated that data may be collected, stored, and aggregated using different methods, and the invention is not limited to any particular method.

Detector

Detector 20c is adapted to detect the control signal anomalies by comparing the records to an anomaly pattern, predetermined thresholds and/or statistical models of prior control traffic and signaled topology. If components of the records and related control signal information exceed the predetermined threshold or statistical models, a control signal anomaly is detected. Thereafter, the detected control signal anomaly and related control signal information can be stored in the database 20g. An example of the control signal anomaly and related control signal information, which is stored in the database 20g, can include a description of the data path through various ISPs 14a, 14b and/or 14c of the network computer system 10 for which a hosting computer system (not shown) provides Internet web pages or other information to a requesting computer system (not shown).

Profiler

The profiler 20d is also adapted to receive the records and related control signal information from the collector 20a and to process the records and related control signal information to generate statistical models of signaled topology and the signal traffic thresholds, which are concomitantly communicated to the detector module 20c. In this configuration, the thresholds and statistical models calculated in the detector 20c are adaptively adjusted based on changing trends or profiles of the records and related control signal information received by the profiler 20d. The changing trends or profiles of the records and related control signal information, for example, can include changes in connection configurations of the various ISPs 14a, 14b and/or 14c; changes in the computer systems 16, which subscribe to the various ISPs 14a, 14b and/or 14c or changes in the data paths previously employed for communicating information between computer systems 16 over ISPs 14a, 14b and/or 14c of the network computer system 10.

Local Controller

Local controller 20f, which is coupled to both the detector 20c and to the profiler 20d, is adapted to receive the control signal anomalies from the detector 20c, as well as the related control signal information, as previously described. After receiving the control signal anomalies and the related control signal information, the local controller 20f generates a signal or an alert message. The alert message can include pertinent information related to the control signal anomaly. The pertinent information related to the anomaly can include the characteristics of the anomaly, path attributes associated with the control signals, the source and destination of the anomaly, the detection mechanism used to identify the anomaly, the predetermined threshold, routing systems in the path of the anomaly, as well as the magnitude or seventy of the anomaly. The alert message is communicated to zone controller 24 to enable the zone controller 24 to further process the alert message and to enable the zone controller 24 to communicate the alert message to other Zones U, V, W, X, Y and Z and/or ISPs 14b and 14c.

Zone Controller

Figure 7:
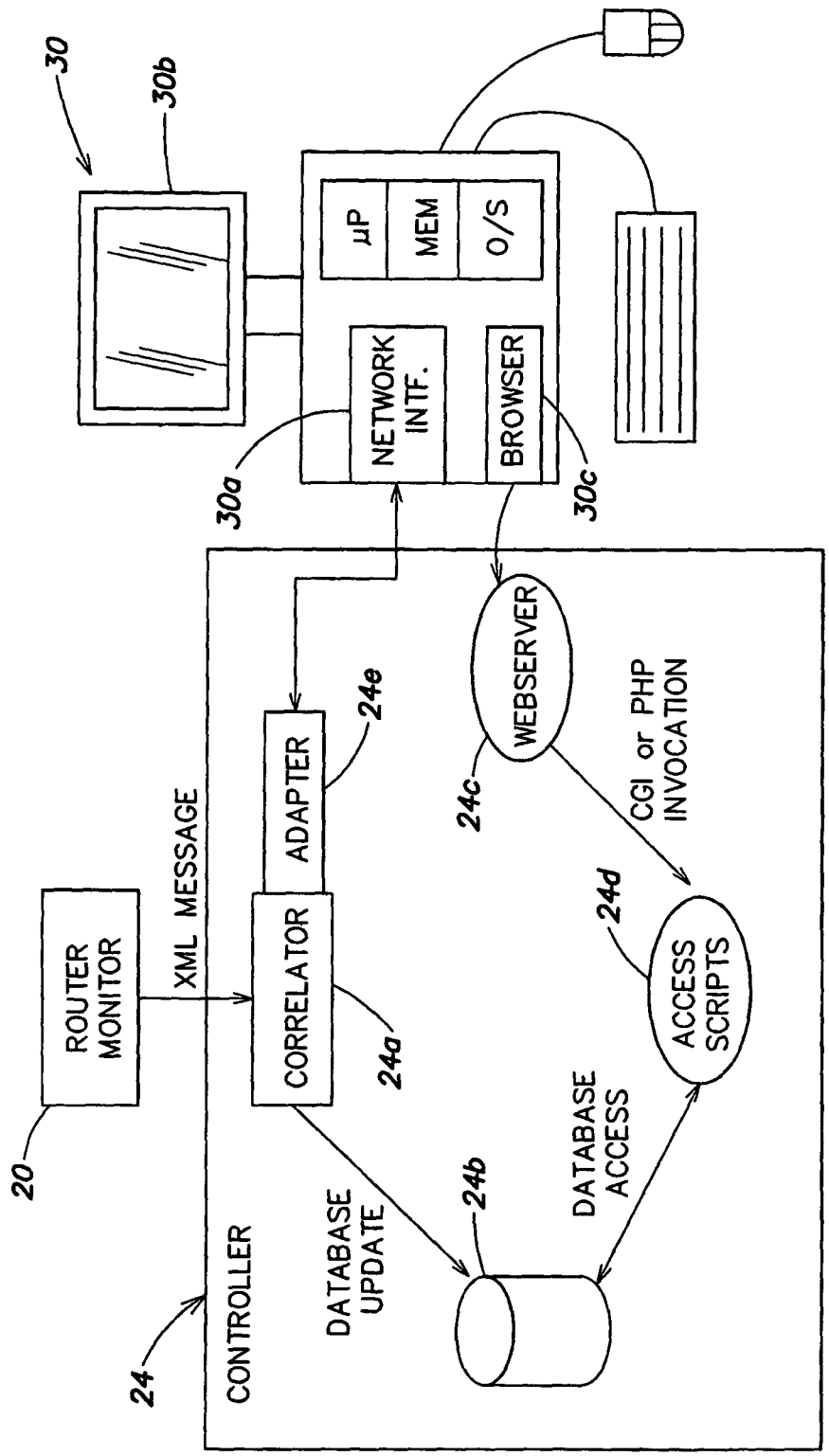
FIG. 7 is a high level block diagram of a controller according to one embodiment of the invention.

Referring further to FIG. 7, in one embodiment the zone controller 24 includes a correlator 24a coupled to the router monitor 20. The correlator 24a includes a communication interface adapter 24e. The zone controller 24 further includes an alert message database 24b, which is coupled to the correlator module 24a. A web server 24c and access scripts software 24d are also defined on the controller 24.

The zone controller 24 is adapted to receive a plurality of alert messages from the router monitor 20, and to process the alert messages by correlating the alert messages based on the pertinent information related to the control signal anomaly, as described above. The zone controller 24 of Zone X, as well as other various controller (not shown), which are included in the other various Zones U, V, W, Y and Z are similarly constructed and arranged as the controller 24 of Zone X.

More precisely, the correlator 24a is adapted to receive and categorize the alert messages and to generate a number of tables including the categorized alert messages. The tables including the categorized alert messages are stored in the alert message database 24b, which is coupled to the correlator module 24a. The correlator module 24a is further adapted to compare the alert messages to determine if trends exist. One example of a trend can be a plurality of alert messages that are traceable through the network computer system 10 to a particular computer system 16. Another example of trend can be a plurality of alert messages that include similar characteristics.

The communication interface adapter 24e operates to provide a communication interface to an external computer device 30, such as a notebook computer, desktop computer, server or personal digital assistant ("PDA") or other type of system. The personal computing device 30 can be adapted to run network management interface software 30a, such as HP OpenView, available from Hewlett-Packard Company of Palo Alto, Calif. The network management interface software 30a is adapted to interface with the alert message database 24b and to provide a graphical user interface ("GUI") on the display 30b of the computing device 30. Thereafter, a network administrator can view and respond to the alert messages.

Alternatively, the personal computing device 30 can include a conventional web browser 30c, which is similarly adapted to interface with the alert message database 24b, via a web server 24c and access scripts module 24d, to provide a graphical user interface ("GUI") on the display 30b of the computing device 30. Similar to that described above, the network administrator can view and respond to the alert messages.

After detection of the anomalous control signal, the controller 24 blocks anomalous control signals as close to their source as possible. By taking a global view of the ISP computer networks 14a, 14b and 14c, the controller 24 is able to coordinate the configuration of the routing systems 22, 22b and/or 22c to filter certain types of traffic by employing either custom filtering hardware (not shown) or filtering mechanisms included in the routing systems.

Referring again to FIG. 5, in one specific example, a malicious control signal attack from a computer system 17 located in Zone U of ISP computer network 14b to one specific computer system 16a of Zone X can be detected, tracked and blocked by the system 5 according to one embodiment of the present invention.

In this example, the malicious control signal attack executed by the computer system 17 includes a BGP message, which is an Internet Protcol. ("IP") packet containing various data indicating that computer system 17 can provide computer system 16a with the most efficient route to a particular destination computer (not shown) for enabling computer system 16a to obtain information (e.g., a requested web page).

Figure 8:
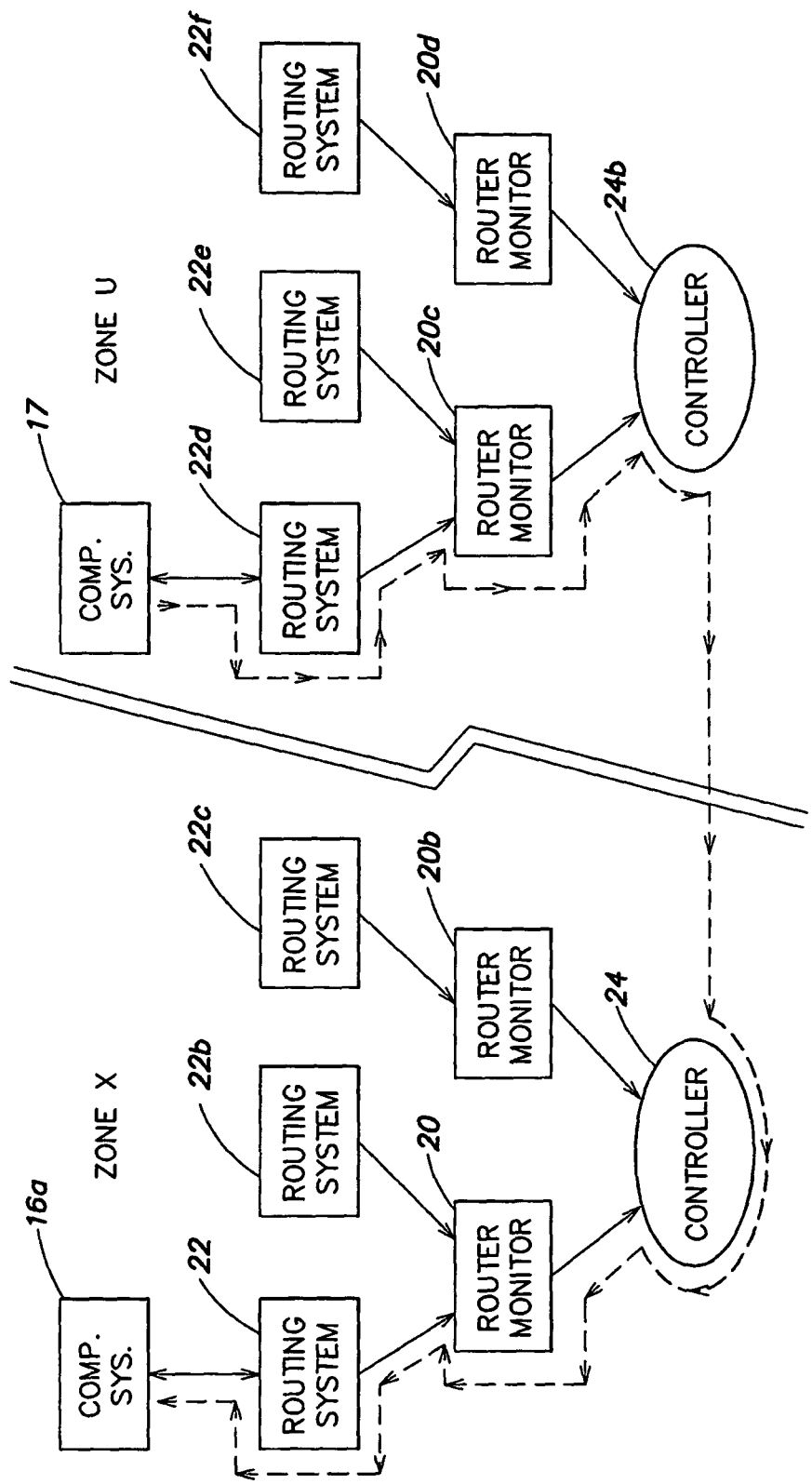
FIG. 8 is a high level block diagram of one aspect of the invention that shows a malicious control signal attack.

Referring further to FIG. 8, the specific trajectory of the malicious control signal attack from the computer system 17 of Zone U located on ISP 14b to computer system 16a of Zone X located on ISP 14a is illustrated by the control signal attack path 200. The control signal attack path 200 commences at the attacking computer system 17 and extends through the routing system 22d, through the router monitor 20c, through the controller 24b, through the computer network 18, through the controller 24, through the router monitor 20, through the routing system 22 and to the targeted computer system 16a.

After IP packets associated with the malicious control signal attack flow through the routing system 22, the routing system 22 generates a control signal and related information packet, which is exported to the router monitor 20. The control signal and related information packet describes the data path or traffic flow characteristics between computer system 17 (control signal attacker) and the computer system 16a (target of control signal attack). The control signal attack can be represented as the computer system 16a receiving an unusual data path instruction from the computer system 17. This anomalous control signal traffic can be detected at the router monitor 20 and an alert message is communicated to the controller 24.

Referring again to FIG. 6, during the above described example of a control signal attack, the collector 20a located on the router monitor 20 receives and processes or normalizes the control signals and related control signal information to generate records. The collector 20a stores a copy of the records in the persistent archive 20b. The collector 20a also provides a copy of the records to the detector 20c and to the profiler 20d. The detector 20c analyzes the records and detects anomalous traffic. In this example, the detector 20c detects the pattern of records as a control signal attack, because attributes associated with the records exceeds a predetermined threshold and statistical models defined on the detector 20c.

After the detector generates an alert, the controller may send a signal to the refiner to gather specific details about the control signal anomaly. Examples of this anomaly detail may include all control messages describing a path to a specific web destination, or all signaled topology changes received by network device 20 during a specified time period. The detailed information is forwarded to zone controller 24.

Refiner

Figure 9:
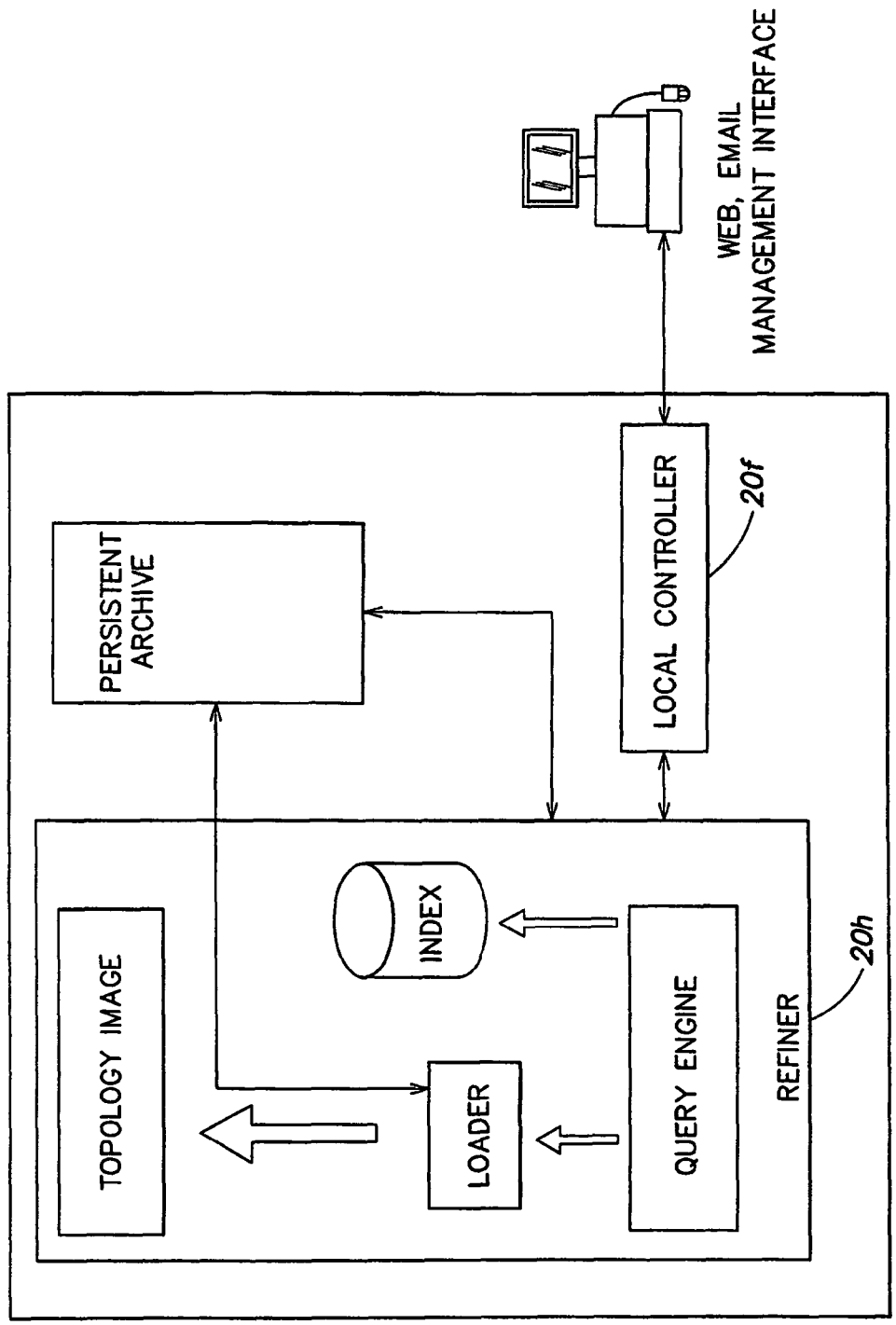
FIG. 9 is a block diagram of a refiner according to one embodiment of the present invention.

FIG. 9 shows a more detailed operation of refiner 20h according to one embodiment of the invention. According to one embodiment of the invention, an instance (e.g., a software process executing in a memory of a computer system) is created that responds to queries directed to one or more databases (e.g., database 20b, 20g, etc.). For example, there may be a process, referred to as BGPRefiner that performs queries regarding BGP routing data. In response to an automated local controller or management station query for detailed information on the signal anomaly, the local controller invokes a new instance of BGPRefiner. Within the BGPRefiner process, the query engine consults local index of data available in the persistent archive to determine what information is needed to respond to query. The query engine then instructs the loader to retrieve the needed data from the persistent archive. The loader reassembles the retrieved data in the memory image to recreate specific elements of the signaled anomaly, or recreate the network topology at the time of the signal anomaly.

In the control signal attack example described earlier, the correlator 24a located on the controller 24 sends a simple network management protocol ("SNMP") alert message (e.g., an SNMP trap message) to the network management interface 30a located on the personal computing device 30. This alert message notifies the network administrator and/or security operators as to the presence of the control signal attack. Included in this alert message is the network address, such as the universal resource locator ("URL") that describes the anomaly's location in the database 24b of the controller 24. The network management interface 30a can share the URL associated with the control signal attack with the web browser 30c also located on the personal computing device 30. The browser 30c can use a hyper text transfer protocol ("HTTP") type transfer using the URL to visualize the statistics related to the control signal attack, and to generate filter entries (e.g., by implementing one or more ACLs, for example), and/or rate limiting parameters (e.g., committed access rate (CAR) parameters) for remediation of the control signal attack. When the web server 24c receives the URL from the browser 30c, the web server 24c invokes server-side access scripts 24d, which generates queries to the database 24b for generating a dynamic HTML web page. The network administrator and/or security operators can view the control signal anomalies on the web page, which is displayed on the display 30b of the computing device 30.

Although not shown, in an embodiment, the system 5 for managing network topology signal information and monitoring, detecting, tracking and blocking control signal anomalies communicated between routers located in various ISPs of a wide area network can be located on a computer-readable medium (e.g., a storage medium, such as an optical or magnetic disk, in a memory of a computer system or controller, or any other type of medium). The storage medium can be transported and selectively loaded onto the routing systems 22, 22b and/or 22c. Alternatively, the system 5 for monitoring, detecting, tracking and/or blocking control signal anomalies communicated between routers located in various ISPs of a wide area network can be partially located on the routing systems 22, 22b and/or 22c and partially located on other servers (not shown), or may be located on one or more systems separate from routing systems 22, 22b, and 22c. For example, the router monitor 20 can be located on routing system 22 and the router monitor 20b can be located on routing system 22c. Further, zone controller 24 can be co-located with either the router monitor 20, the router monitor 20b or zone controller 24 can be located on another server (not shown). It should be appreciated that various aspects of the invention may be implemented in any location within the computer network, and the invention is not limited to any particular location.

Query Facility

As discussed above, a query facility may be provided to allow users to access data in the routing database. This query facility may be provided, for example, by refiner 20h. More particularly, the query facility may process the data stored in the routing database to perform useful queries, allowing users to analyze current and past network routing behavior in ways which were not possible with previous techniques. Using the query facility, users can perform data mining of the historical routing data, analyze how routing topology and state evolve over time, and view the routing topology and state for any arbitrary moment in time, including the current state. Users can also track network instability and interesting or anomalous routing events (e.g., those occurring in a network routing protocol such as BGP, for example). The ability to perform queries greatly simplifies the identification, tracing, and remediation of network problems both inside the monitored network as well as in other parts of the Internet. Such an ability also helps with planning for future network growth, as queries of the routing database can be used to identify stable and high-quality networks which would make good candidates for peering or from which to purchase transit or upstream service.

For queries, a start and stop time can be specified. In this case, only results for the given time period are returned. These times may be specified, for example, using a natural language interface that can be as formal as a standard timestamp string ("12:05:03 Mar. 5, 2002"), or as informal as "two days ago". If a start time is not specified, then the system may assume a start time of the first data it collected. If no stop time is specified, the system may assume the current time. Other time specification options may be available for certain query types, described below. Queries, according to one embodiment of the invention, can be performed by either a user, or by another component of the system (such as a statistical modeling engine described in more detail below) that uses the data to provide other services.

Types of Queries

Routing Topology Queries

The query facility supports several types of routing topology queries. According to one embodiment, the query facility can recreate the entire routing table for any point in history up to and including the current time. According to another embodiment, the query facility can provide a list of all route and topology changes between two arbitrary points in time. Also, according to yet another embodiment, the query facility can provide an aggregated change summary—that is, the net change in routing topology and state between any two points in time.

In addition to the time specification options described above, routing topology queries can also specify a request for the current state of the routing topology. In this case, all contents of the current routing table are returned that match any other supplied parameters, described below. If the query is for a routing table dump for a given point in time, then the start and stop times may be set to the requested time for the routing table dump.

Queries can be specified to return all results, or only results matching a given set of parameters. Parameters that may be specified in a query include, for example:

router
inferred peer (described below)
exact default-free prefix
routes for prefixes that include a given prefix
routes for prefixes that are included by a given prefix
routes matching an AS regular expression Any combination of the above parameters can be specified for each query. In addition, the user can specify exactly which attributes (e.g., BGP attributes) to be returned for each route or route change. Any combination of attributes may be selected for any query. According to one embodiment, BGP attributes included in the BGP specification are supported.

As discussed above, one embodiment of the system identifies inferred peers. An inferred peer is a network-level peer (not a BGP peer) that is identified by the system. A network-level peer is a network that directly exchanges traffic and routes with the monitored network. Network level peers are inferred by examining the routing table from all of the monitored routers. If a router for a given AS, X, reports routes that include an AS path in which AS Y is the first AS (for iBGP (Interior BGP) peering sessions) or in which AS X is the first AS and AS Y is the second AS (for eBGP (Exterior BGP) peering sessions), then AS Y is inferred to be a peer of AS X.

Statistic Queries

Statistics kept by the statistic store can also be queried. As with routing topology queries, statistic queries can be specified for any type of statistical information that is kept, for any time period for which there is data. and can be performed for all monitored data, a specific router, or a specific inferred peer. Because statistics queries are generally numeric data, the results may be returned to the user in both a tabular format and as a line graph of the data over the time period queried.

Example Routing Topology Query Procedure

According to one embodiment of the invention, a query facility performs routing topology queries using the following algorithm. The query is given a start and stop time, as described above. The query facility (implemented by refiner 20h, for example) then performs the following steps to find the results of the query:

1. Establish routing state for start of query
2. Set search start time to the latest of: the given query start time, the first system start time, or if the query is for a single router, when peering was established
3. Find most recent routing snapshot prior to the search start time, and load it as the initial routing table. If no dump exists prior to the search start time, set initial routing table to be empty.
4. Starting at the time of the snapshot, or at the search start time if the initial state is empty, apply all changes from the change store in order to the initial routing table, starting with the first change after the snapshot was taken, up to the search start time.
5. The resulting routing table at the end of step 3 above is the routing table for the start of the query.
6. Return all entries from the initial routing table that match the specified query parameters.
7. If the start time is "now", or the current time, then stop.
8. If the query is for a list of route changes, then starting with the search start time, output all changes from the change store in order that match the query parameters, ending with the supplied end time, or the most recent change received, whichever is earlier.
9. If the query is for an aggregated change summary, save initial routing table. Then apply all changes from the change store to the initial routing table, up to the specified end time or the latest change, whichever is earlier. Return the difference between the initial routing table and the final routing table.

Statistical Modeling Engine

In addition to the raw data on number and type of changes that occur, the system may build a statistical model of the observed network behavior, which it uses to help identify routing and topology problems. These statistics are calculated based on the observed routing topology and the change history. These statistics may be calculated for example, by a statistical modeling engine of profiler 20d of monitor 20. These statistics may be provided to detector 20c to assist in detecting anomaly conditions. There are several classes of statistics that may be observed, and which serve as the basis for the anomaly detection carried out by detector 20c, described above. Detector 20c may include an anomaly detection engine (not shown) that performs anomaly detection functions using several types of statistics described below.

BGP Update Statistics

The statistical modeling engine models may model, for example, BGP update statistics as discussed above. As with collector 20a described above, statistical models may be built for each of these types of routing changes on a network-wide, per-router, and per-inferred-peer basis.

The statistical model for each type of event may include a set of averages/standard deviation pairs, one for each of several timeframes. For example, one average and standard deviation is calculated and updated for every 5-minute sample that is taken. Another may be calculated and continually updated separately for each 5-minute time period in a single day (e.g. all 5-minute samples from 8:10 am every day may be averaged together.) Finally, one is calculated and continually updated for each 5-minute sample period over the course of an entire week. These values are used by the anomaly detection engine to detect certain types of anomalous routing instability, as described below.

Route Distribution Statistics

According to one embodiment of the invention, the system may model Internet topology and path characteristic probabilities from the local BGP domain's perspective. For example, the system (e.g., system 5) calculates probabilities based on long-term historical behavior inferred from the monitored BGP information. This information includes the tens of thousands of BGP update messages that BGP backbone routers typically receive in the Internet each day.

As discussed above, the system may calculate probabilities of individual ASPath adjacencies, path origination from a given AS, and path selection over moving window timeframes. For example, the system may observe, for example, that the address block for a particular website (for example, www.website.com) originates from both a BGP router in autonomous system for Website Company, Inc and Website Company Subsidiary, Inc. In this example, this is an Internet site critical to a business' workflow.

Over the course of several months, the path remains stable from both of these companies. For this given prefix (and similarly for the hundreds of thousands of other Internet address blocks), the system calculates and expected range of path characteristics (probabilities). For any significant change in path characteristics, the system will automatically generate anomalies per user-configured alerting behaviors (see next section). So, if the Internet path to www.website.com suddenly changes to originate from an previously unknown AS, a alert may be generated.

Anomaly Detection Engine

The anomaly detection engine uses the statistical models developed by the statistical modeling engine to detect anomalous network behavior, and take appropriate action based on the severity of the anomaly. Anomalies based on configurable static thresholds may also be performed. As with the statistical models described above, there are several types of anomalies that can be detected.

Instability Anomalies

Instability anomalies may be detected, for example, based on the BGP update statistical models calculated by the statistical modeling engine. They may be referred to as instability anomalies because an anomalous level of BGP changes (e.g., frequent routing changes) is a sign of network and routing instability. Detecting instability anomalies gives a network operator a head start on detecting and solving network problems, rather than waiting until network services are compromised. One advantage of detecting anomalies according to various aspects of the invention is that not only do the detections indicate to the network operator that a problem is occurring, they give a precise description of where the problem is occurring and what exactly is happening.

Instability Anomaly Detection

Instability anomalies may be detected based, for example, on a comparison of the most recent measurement for a given type of data and a weighted combination of the averages and standard deviations that have been calculated for the given data.

Event Notification Service

The system may also provide an event notification service that allows users to specify network events or routing and topology state changes that they wish to be notified of when they occur. This event notification service may be provided, for example, by controller 24. Events can be specified using the same parameters used when specifying a query. However, rather than returning all state matching the query parameters, the system may instead send a notification whenever the associated state changes. Notifications can be sent, for example, using email, remote syslog, or by sending an SNMP trap to a network address.

An event notification service is very useful for detecting changes to correct routes, and for being alerted to changes in network connectivity. This service, according to one embodiment of the invention, may provide robust early warning system for network problems.

The event notification service is also used, for example, by the anomaly detection engine to notify users about detected anomalies.

Remote Monitoring Service

An important part of network routing topology analysis is determining what view other networks have of the routing topology. When a network announces its own routes to other networks (e.g., to the rest of the Internet), they can be manipulated or corrupted by other networks that propagate them. This can cause other networks to have an incorrect view of how to reach that network. Even worse, other networks can either intentionally or accidentally hijack or alter those routes, causing some or all of the network (e.g., the Internet) to be unable to reach the original network, and perhaps even causing traffic for that network to be diverted to another location entirely. The original network does not perceive these incorrect route announcements directly, because they occur in other parts of the Internet and the incorrect route announcements are not sent to it directly.

To help address this problem, a system according to one embodiment of the invention may be capable of importing information from remote routers that are not being directly monitored. This capability may be provided, for example, by remote monitoring. This remote monitoring may include placing one or more monitors 20 at diverse points within the Internet topology, and monitoring one or more routers at each point. According to one aspect of the invention, the system may monitor as many different networks (ASes) as possible, to achieve the widest possible view of the variation in Internet routing topology at different points in the Internet. This set of monitors form the infrastructure for the remote monitoring service. They may be, for example, administered by a third party, and made publicly available to users of the system for the purpose of querying against remote views of the network topology.

Remote Queries

To use the remote monitoring service, a user simply accesses the user interface on their local monitor 20, just as he or she would do in normal use (for example, to execute a query). They can then specify a query as described in the section on the query facility. In addition, they can specify the source of information for that query. This can be any set of remote monitors 20 that are available. Each monitor 20 provides the network-wide view of the network it is monitoring, and all queries are made against only that view, as opposed to the per-router and per-inferred-peer data that can be accessed on the monitor 20. The other network views may not be provided to a user to protect security and confidentiality of the remote network, not due to technical reasons. The system may be capable of querying and displaying that information in a similar manner as discussed above.

One useful use of this remote query facility is to determine how other networks view the user's network. To determine this, two queries are made. In the first query, all remote collectors are queried for all routes containing the local network's AS number, using an AS regular expression query. In the second query, all remote collectors are queried for routes matching the local network's assigned IP address space. Together, these two queries provide a complete picture of how all remotely-monitored networks view the local network, and can be used to identify problems such as deaggregated or hijacked routes.

Locating Remote Monitors

To perform remote queries, monitors 20 may be located for the purpose of executing. This can be performed by one of several methods. For example, a list can be maintained by the third party that maintains monitors, and which is downloaded and updated periodically. Alternatively, a multicast group can be formed, which monitors 20 would join and periodically send a message to a well-known multicast address to announce their presence.

User Interface

For user-visible features, such as the query facility, and the configuration and viewing of anomalies and traps, several different types of interfaces may be provided. For example, a command-line interface (CLI) may be provided that accepts simple text-based commands for accessing features. A graphical user interface (GUI) may, according to one embodiment of the invention, allow direct graphing and viewing of system data, as well as more elaborate output formats that are supported by the CLI. The CLI, may be, for example, a standard VT100 compatible terminal interface accessible through the standard protocols telnet or ssh programs. The GUI may also use a standard web interface, with HTTPS for security, for accessing the system. Any standard web browser can be used to access the GUI with full security and all capabilities. It should be appreciated that any user interface may be used to view anomaly and other data.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting.

The invention claimed is:

1. A method for monitoring control signal traffic over a computer network comprising a plurality of routers by a monitoring computer system, the method comprising acts of:
   receiving, by the monitoring computer system from at least one of the plurality of routers, at least one routing control signal communicated to one or more other routes;
   storing the at least one routing control signal in a database of the monitoring computer system;
   retrieving, by the monitoring computer system, at least one routing control signal from the database of the monitoring computer system relevant to at least one subsequently received routing control signal;
   comparing, by the monitoring computer system, the at least one subsequently received routing control signal with the at least one routing control signal retrieved from the database of the monitoring computer system; and
   identifying, in response to the act of comparing the at least one subsequently received routing control signal with the at least one routing control signal retrieved from the database by the monitoring computer system, at least one change to a network topology of the computer network; and
   determining, by the monitoring computer system, that the at least one change to the network topology of the computer network is an anomaly in a routing database of the computer network comprising the plurality of routers.

2. The method according to claim 1, wherein the at least one routing control signal controls forwarding of data in the computer network.

3. The method according to claim 1, wherein the at least one routing control signal is a route entry stored in a memory of the at least one of the plurality of routers.

4. The method according to claim 1, wherein the at least one routing control signal is a route update transmitted by the at least one of the plurality of routers.

5. The method according to claim 1, further comprising an act of generating an alert signal based on the determined anomaly.

6. The method according to claim 1, wherein the act of storing further comprises storing a plurality of routing control signals over time.

7. The method according to claim 1, further comprising an act of performing, in response to the act of determining the anomaly, an administrative act in the computer network.

8. The method according to claim 1, wherein the anomaly includes one or more attributes and the method further comprises an act of tracking the one or more attributes of the anomaly to at least one source.

9. The method according to claim 8, further comprising an act of filtering a routing control signal produced by at least one source that relates to the anomaly.

10. The method according to claim 8, wherein the act of filtering is performed in one of the plurality of routers.

11. The method according to claim 10, further comprising an act of creating a filter in at least one of the plurality of routers to filter control data transmitted by the at least one source.

12. An apparatus for monitoring control signal traffic over a computer network comprising a plurality of routers, the apparatus comprising:
   a monitor that receives, from at least one of the plurality of routers, at least one routing control signal communicated by the at least one router to one or more other routers of the plurality of routers and which stores the at least one routing control signal in a database, and wherein the monitor is further configured to retrieve at least one routing control signal from the database relevant to at least one subsequently received routing control signal and compare the at least one subsequently received routing control signal with the at least one routing control signal retrieved from the database, and wherein the monitor is further configured to identify, in response to the act of comparing the at least one subsequently received routing control signal with the at least one routing control signal retrieved from the database, at least one change to a network topology of the computer network;
   a detector that detects an anomaly in a routing database of the computer network based on the at least one change; and
   a controller that is configured to receive the detected anomaly from the detector, and is adapted to communicate the anomaly in an alert message.

13. The apparatus according to claim 12, further comprising a controller that receives, from the monitor, the at least one routing control signal and stores the at least one routing control signal in the database.

14. The apparatus according to claim 12, wherein the monitor stores the at least one routing control signal in a persistent archive.

15. The apparatus according to claim 12, further comprising a profiler that generates a profile of at least one of network communication trends in the computer network and topology of the computer network.

16. A non-transitory computer-readable medium encoded with instructions for execution on a computer system, the instructions when executed, perform a method comprising acts of:

receiving, by a monitoring computer system from at least one of a plurality of routers, at least one routing control signal communicated to one or more other routers;

storing the at least one routing control signal in a database of the monitoring computer system;

retrieving, by the monitoring computer system, at least one routing control signal from the database of the monitoring computer system relevant to at least one subsequently received routing control signal;

comparing, by the monitoring computer system, the at least one subsequently received routing control signal with the at least one routing control signal retrieved from the database of the monitoring computer system; and identifying, in response to the act of comparing the at least one subsequently received routing control signal with the at least one routing control signal retrieved from the database by the monitoring computer system, at least one change to a network topology of the computer network; and determining, by the monitoring computer system, that the at least one change to the network topology of the computer network is an anomaly in a routing database of the computer network comprising the plurality of routers.

17. The computer-readable medium according to claim 16, wherein the at least one routing control signal controls forwarding of data in the computer network.

18. The computer-readable medium according to claim 16, wherein the at least one routing control signal is a route entry stored in a memory of the at least one of the plurality of network routers.

19. The computer-readable medium according to claim 16, wherein the at least one routing control signal is a route update transmitted by the at least one of the plurality of routers.

20. The computer-readable medium according to claim 16, the method further comprising an act of generating an alert signal based on the determined anomaly.

21. The computer-readable medium according to claim 16, wherein the act of storing further comprises storing a plurality of routing control signals over time.

22. The computer-readable medium according to claim 16, the method further comprising an act of performing, in response to the act of determining the anomaly, an administrative act in the computer network.

23. The computer-readable medium according to claim 22, wherein the anomaly includes one or more attributes and the method further comprises an act of tracking the one or more attributes of the anomaly to at least one source.

24. The computer-readable medium according to claim 16, the method further comprising an act of filtering a control signal produced by the at least one source that relates to the anomaly.

25. The computer-readable medium according to claim 24, wherein the act of filtering is performed in one of the plurality of routers.

26. The computer-readable medium according to claim 16, the method further comprising an act of creating a filter in the router to filter control data transmitted by the at least one source.

* * * * *